March 3, 1953  J. E. FARRELL  2,630,168
GASIFIED FUEL OIL BURNER
Filed Oct. 25, 1950  2 SHEETS—SHEET 1
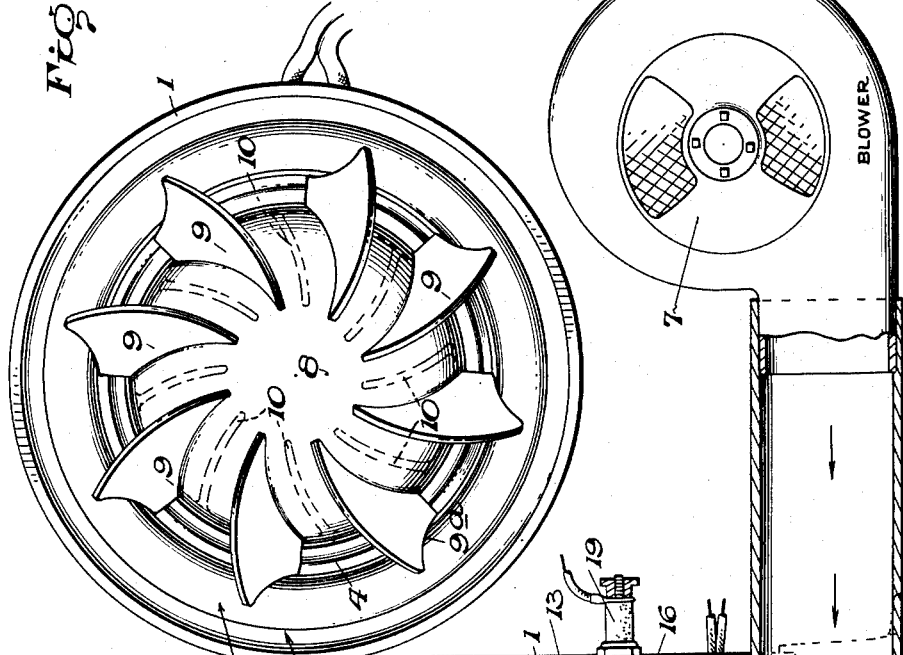
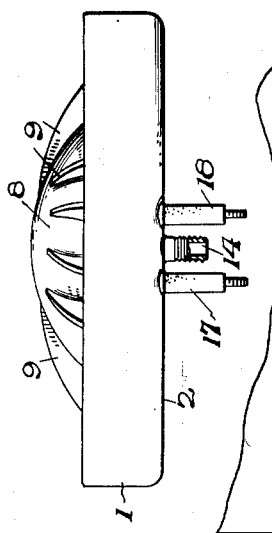
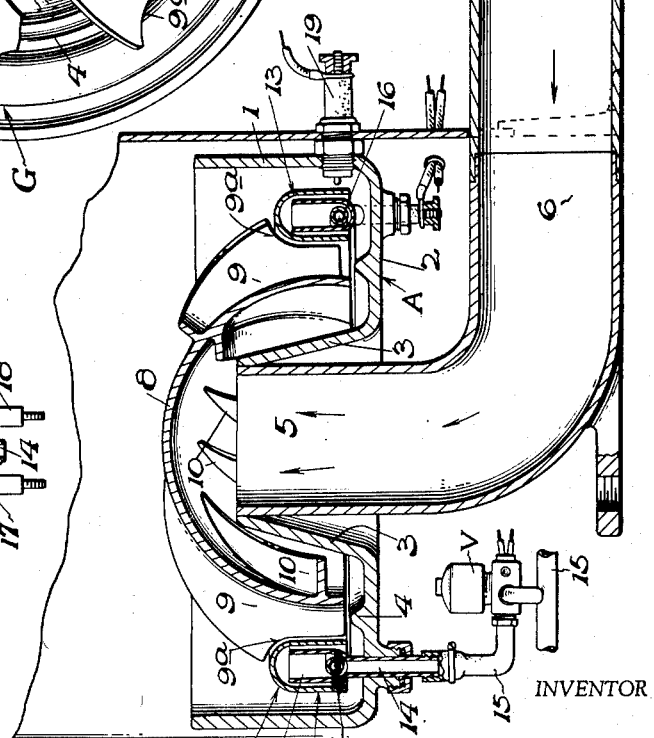
INVENTOR
Joseph E. Farrell.
BY
ATTORNEY March 3, 1953 — J. E. FARRELL — 2,630,168
GASIFIED FUEL OIL BURNER
Filed Oct. 25, 1950 — 2 SHEETS—SHEET 2

INVENTOR
Joseph E. Farrell.
BY
ATTORNEY

Patented Mar. 3, 1953

2,630,168

UNITED STATES PATENT OFFICE 2,630,168

GASIFIED FUEL OIL BURNER

Joseph E. Farrell, Island Heights, N. J., assignor to Farspan Industries, Inc., Island Heights, N. J., a corporation of New Jersey Application October 25, 1950, Serial No. 192,111

4 Claims. (Cl. 158—53)

This invention relates to fuel burners, and more particularly to an improvement in the type wherein liquid fuel is converted to a dry gas and the latter mixed with air to support combustion to produce a flame of high thermal efficiency with a minimum consumption of liquid fuel.

One of the objects of the invention is to provide a fuel burner of the type above set forth which consists of a minimum number of parts, and from a practical standpoint permits of effective use and is easy to assemble in conjunction with the generator and the necessary electrical controls.

A further object of the invention is to provide a burner comprising a body in the nature of a support having a central portion which communicates with an air supply duct, and which central portion and air duct are covered by a dome like burner head having fins for distributing air to and about a dry gas distributing element or generator. In that connection, the generator is started by electrical ignition means, but after a predetermined period of operation under electrical energization the generator becomes effective by the heat of the flame generated by the burner head and the electrical circuit automatically cuts off.

A further object of the invention is to provide a novel generator unit preferably of ring like form which will serve to generate gas initially for starting and during continued operation after the expiration of the preliminary ignition and period. According to one embodiment of the invention the initial and sustained operation of the generator may take place in one and the same structure within the burner, while according to a second embodiment of the invention, the portion of the generator which provides for initial or starting gasification may be located outside of the burner support.

With the above and other objects in view which will more readily appear as the nature of the invention is better understood, the same consists in the novel construction, combination, and arrangement of parts, hereinafter more fully described, illustrated and claimed.

A preferred and practical embodiment of the invention is shown in the accompanying drawings in which:

Figure 1 is a vertical sectional view of one embodiment of the invention installed in a furnace casing or the like.

Figure 2 is a top plan view of the burner showing the burner head and the support therefor.

Figure 3 is a side elevation of the generator unit with the burner head resting thereon.

Similar reference characters designate corresponding parts throughout the several figures of the drawings.

Figure 4:
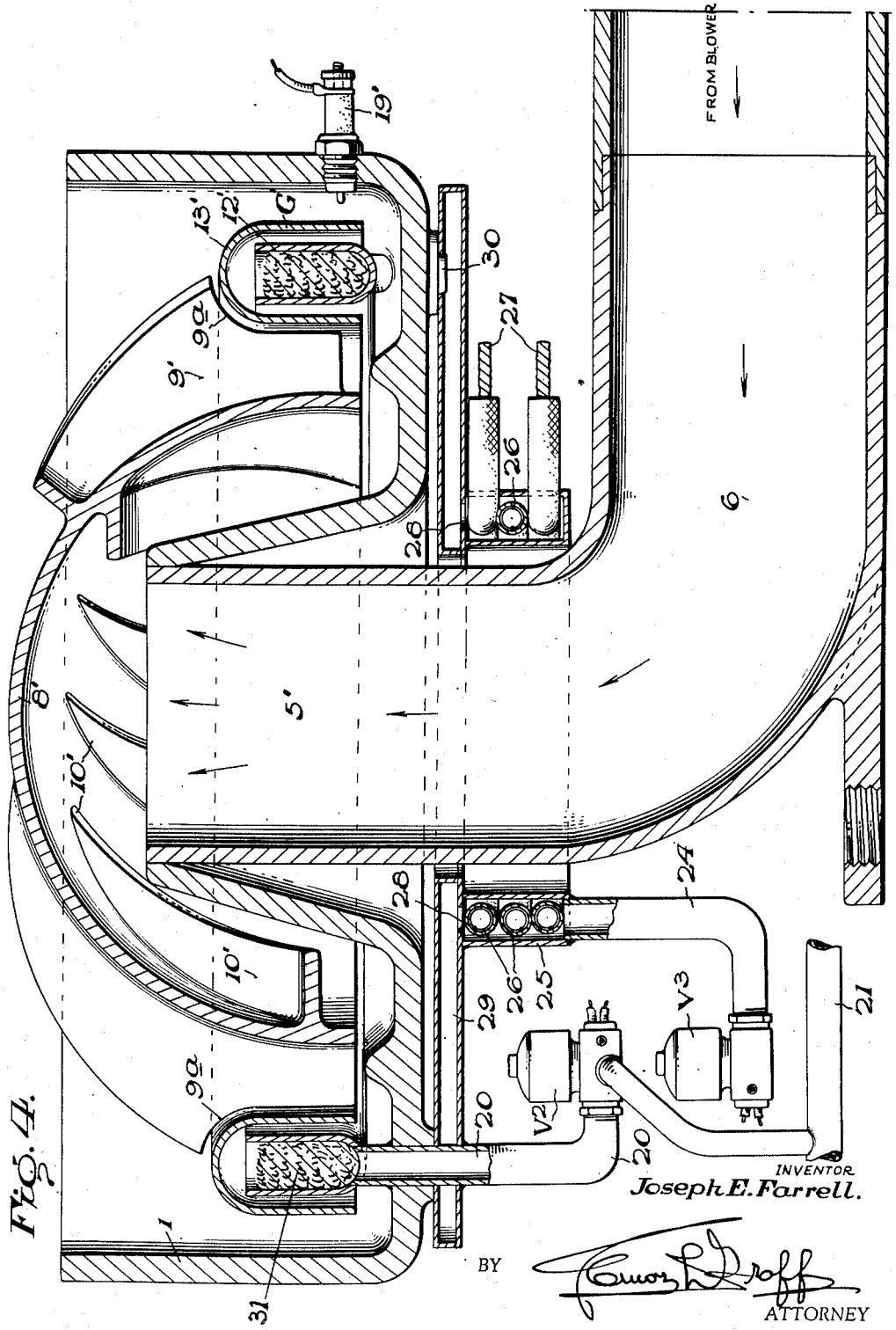
Figure 4 is a vertical sectional view of the modified form wherein the initial gas generating portion of the generator is located outside and below the support.

Referring to Figure 1, it will be seen that the burner includes in its organization a support designated generally as A. This support may be of substantially cup like formation and preferably includes an upstanding outer wall 1, a bottom wall 2 and a central frusto-conical central wall 3. The bottom 2 is provided with an upstanding rib 4 surrounding the central wall 3 and located medially between the outer wall 1 and said central wall 3.

The central frusto-conical wall 3 fits over the upstanding portion 5 of an air duct 6 which is supplied with an air blast from a fan or blower of conventional type and designated generally as 7. The upper end of the frusto-conical central wall 3 rests on the upper end of the upturned portion 5 of the air conduit to center and substantially carry the support 1.

The upper discharge or outlet end 5 of the air duct is covered by a dome like burner head 8 which has the general function of directing the air issuing from 5 downwardly toward the bottom wall 1 of the support and against the rib 4. For the purpose of causing and maintaining effective distribution of the air blast the dome or canopy like burner head 8 is provided with a series of annularly spaced outer fins 9 and a series of annularly spaced inner fins 10. As will be seen from Figure 2, the outer fins 9 and inner fins 10 are in staggered relation and in both instances the fins are of substantially arcuate or convolute formation to produce, in the case of the inner fins 10, a downwardly and outwardly sweeping or swirling blast of air directed to the bottom wall 2 behind the rib 4, and on the other hand the outer fins 9 pick up the air and products of combustion to provide a vortex type flame. The outer fins 9 are preferably notched in their outer edges as indicated at 9a to partially overlie the ring like generator designated generally as G. This generator, in both forms of the invention, consists of an inner upwardly opening channel 12 and a substantially telescopically inverted channel 13 whose side walls are spaced to provide therebetween a continuous gas passage. The inner channel 12 is provided with a fuel inlet 14 communicating with a line 15 containing the fluid level control valve V and in turn communicating with an oil tank or other source of supply. An electrical heating unit of the calrod type designated as 16 is supported in the bottom of the upwardly opening channel 12 which is in communication with the source of fuel supply. This calrod unit, as will be seen from Figure 3, is provided with suitable terminals 17 and 18 to be connected in an electric circuit, with suitable controls, to become sufficiently hot to convert liquid fuel from the fuel burner into a dry gas which is aspirated out of the passage between the walls of the members 12 and 13.

The calrod member 16 is a part of the initial gas forming means used upon starting the burner. That is to say, when the burner is cold and the thermostat calls for heat, a circuit is closed simultaneously to an ignition plug 19 and the calrod unit, and for an appropriate time, say approximately ninety seconds, the calrod unit heats up the residual oil in the channel 12 to the gasification point and the air furnished by the blower 7 mixes with the gasified fuel and becomes ignited by the spark plug 19. When the calrod unit and ignitor are cut off the blower 7 continues to supply air and the heat of burner combustion will continue gasification of the liquid fuel in the generator 12—13 and sustain burner operation as such so long as the blower supplies air.

Figure 4 illustrates a modification of the generator wherein the initial gas forming function is performed outside of the generator proper. In this embodiment of the invention, the generator G', comprising the inner channel 12' and inverted outer channel 13' is connected with a fuel inlet pipe 20, which pipe connects with a valve V² in the fuel supply line 21. Said fuel supply line also communicates with valve V³ having pipe 24 leading to a housing 25 which contains a calrod coil 26. At this point it may be noted that the valves V, V² and V³ are all of the same type, namely electric solenoid valves of the metering type, normally closed, and opening upon thermostat demand, or upon closing a manually operated switch.

The coil 26 has terminals 27 for connecting the same in circuit with the required controls and its related valve. Fuel supplied through pipe 24 to the casing 25 becomes gasified and passes through ports 28 into an annular gas distributing chamber 29 which communicates with the upwardly directed channel 12' of the generator G' through the pipe connection 30. It will, of course, be understood that there may be more than one pipe 30 connecting gasifying chamber 29 with the channel 12'.

The pipe 20 which supplies liquid fuel direct to the channel 12' is provided with liquid level control valves which operate in synchronism with the supply to the pipe 24 to provide liquid fuel for initial and sustained operation.

When the construction of Figure 4 is in use, and there is a demand for heat from the thermostat, the calrod unit 26 and the spark plug or ignitor 19' becomes energized, and dry gas from the casing 25 passes through openings 28 of the chamber 29 and thus into the generator G' through openings 30 to be ignited by the spark plug 19'. The blower being in operation simultaneously with the energization of the calrod coil and the ignitor causes initial combustion around and about the generator G' and after the desired period of initial operation the continued operation of the burner depends upon fuel fed in the chamber 12' through the pipe 20.

As shown in Figure 4, the channel 12' may be filled with mineral wool 31 or the like to obtain better gasification and more even distribution of gas from the liquid fuel.

The operation of both forms of the invention is the same except for the slight differences in the structure of the generator. However, in both cases, that is in effecting initial or sustained combustion, the air supplied from the blower or fan discharges from the upper end of the blower conduit against the inner face of the dome shaped burner head 8 whereupon it is directed downwardly toward the bottom of the support and the rib 4 diffuses the air upwardly through the fins 9 and also about the generator G or G', thus effectively aspirating dry gas from the generator and mixing it with air to sustain combustion. As will be seen from the drawings, the construction and arrangement of the burner head 8 is such that the generator G or G' lies in the zone of air turbulence caused by the rib 4, thereby effectively insuring proper mixing of gas and air, and likewise insuring that the generator is bathed in flame through the periods of initial and sustained combustion to produce the desired heating effect.

Without further description, it is believed that the invention will be readily understood, and it will, of course, be apparent that changes in the structure may be made within the scope of the appended claims.

I claim:

1. A burner for supporting the combustion of dry gas generated from liquid fuel, comprising, a support having a bottom wall, a frusto-conical central wall for receiving the inlet end of an air blast conduit, a rib on the bottom wall, a burner head of dome like formation having inner fins, said burner head serving as a canopy to receive air from said conduit and direct it to the passages formed between the inner fins downwardly toward said rib, a generator unit including dry gas distributing means surrounding the lower portion of the burner head and lying in the zone of air turbulence caused by air passing over said rib and fins on the exterior of said burner head defining passages projecting upwardly from said zone for carrying fuel-entrained air.

2. A burner for supporting the combustion of a dry gas generated from liquid fuel, comprising, a support having a bottom wall, a frusto-conical central wall adapted to receive an air blast inlet, a dome like burner head having inner fins, said inner fins having their upper portions resting on the upper edge of the said central wall to space the inner face of the burner head therefrom to insure passages for directing air downwardly toward the bottom wall, an upstanding rib on the bottom wall contiguous to the lower edge of the burner head and adapted to deflect air from the inner walls upwardly and outwardly, a generator ring surrounding the burner head, said generator ring lying in the zone of air discharge over the rib and fins on the exterior of said burner head defining passages projecting upwardly from said zone for carrying fuel-entrained air.

3. A burner for supporting the combustion of a dry gas generated from liquid fuel, comprising, a support having a bottom wall and an upstanding outer side wall surrounding and spaced from a hollow frusto-conical center wall, an upstanding air distributing rib on the said bottom wall between the outer and center walls, a burner head of dome like formation, outer and inner fins on said head, said fins being of convolute form and the outer and inner fins being in staggered relation, the inner fins having their upper portions resting on the upper edge of the central wall and providing air passages between the inner face of the head and the said upper edge of the central wall, and the outer edges of the outer fins being notched, a gas generator nested in the notched portion of the outer fins, means for supplying liquid fuel to the generator, a heating element in the generator, ignition means for initially starting the generator in operation, and an air blast conduit extending into the central wall and adapted to discharge air against the inner face of the head when the inner fins direct air toward the rib which deflects the same to the outer fins and about the generator.

4. A burner for supporting the combustion of a dry gas generated from liquid fuel, comprising, a support having a bottom wall and an upstanding outer side wall surrounding and spaced from a hollow frusto-conical center wall, an upstanding air distributing rib on the said bottom wall between the outer and center walls, a burner head of dome like formation, outer and inner fins on said head, said fins being of convolute form and the outer and inner fins being in staggered relation, the inner fins having their upper portions resting on the upper edge of the central wall and providing air passages between the inner face of the head and the said upper edge of the central wall, and the outer edges of the outer fins being notched, a gas generator including a portion nested in the notched portion of the outer fins and an initial gas generating chamber located below and outside of the bottom wall of the support and having piped communication with the said portion nested in the fins, means for supplying liquid fuel to the portion of the generator nested in the fins and to the initial gas generating chamber, ignition means on the support and in arcing relation to the portion of the generator nested in the fins, a heating element in the initial gas generating chamber, and an air blast conduit extending into the central wall and adapted to discharge air against the inner face of the head when the inner fins direct air toward the rib which deflects the same to the outer fins and about the generator.

JOSEPH E. FARRELL.

REFERENCES CITED

The following references are of record in the file of this patent:

UNITED STATES PATENTS

| Number | Name | Date |
|---|---|---|
| 501,692 | Putnam | July 18, 1893 |
| 1,555,855 | Hennebohle | Oct. 6, 1925 |
| 1,559,939 | Dahl | Nov. 3, 1925 |
| 1,569,250 | Archer | Jan. 12, 1926 |
| 1,588,763 | Logan | June 15, 1926 |
| 1,601,857 | Heymsfield | Oct. 5, 1926 |
| 1,651,628 | Pecker | Dec. 6, 1927 |
| 1,685,804 | Buerger | Oct. 2, 1928 |
| 1,753,146 | Grant | Apr. 1, 1930 |
| 1,764,109 | La Branch | June 17, 1930 |
| 1,861,997 | Behrsin | June 7, 1932 |
| 2,460,451 | Farrell | Feb. 1, 1949 |

FOREIGN PATENTS

| Number | Country | Date |
|---|---|---|
| 318,728 | Italy | June 19, 1934 |
| 773,085 | France | Aug. 25, 1934 |
| 451,452 | Great Britain | Aug. 6, 1936 |